United States Patent
Maekawa (10) Patent No.: US 11,377,027 B2
(45) Date of Patent: Jul. 5, 2022

(54) IMAGE PROCESSING APPARATUS, IMAGING APPARATUS, DRIVING ASSISTANCE APPARATUS, MOBILE BODY, AND IMAGE PROCESSING METHOD

(71) Applicant: KYOCERA Corporation, Kyoto (JP)

(72) Inventor: Takashi Maekawa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 153 days.

(21) Appl. No.: 16/758,970

(22) PCT Filed: Oct. 5, 2018

(86) PCT No.: PCT/JP2018/037467
§ 371 (c)(1),
(2) Date: Apr. 24, 2020

(87) PCT Pub. No.: WO2019/082628
PCT Pub. Date: May 2, 2019

(65) Prior Publication Data
US 2021/0046870 A1 Feb. 18, 2021

(30) Foreign Application Priority Data
Oct. 26, 2017 (JP) .............................. JP2017-207177

(51) Int. Cl.
*B60R 1/00* (2022.01)
*G06T 5/00* (2006.01)
(Continued)

(52) U.S. Cl.
CPC ................ *B60R 1/00* (2013.01); *G06T 5/006* (2013.01); *G06T 7/70* (2017.01); *G06T 11/00* (2013.01);
(Continued)

(58) Field of Classification Search
None
See application file for complete search history.

(56) References Cited

U.S. PATENT DOCUMENTS 8,792,039 B2 7/2014 Hirooka et al.
2011/0249153 A1 10/2011 Hirooka et al.
(Continued)

FOREIGN PATENT DOCUMENTS

CN 102265599 A 11/2011
EP 2 381 673 A1 10/2011
(Continued)

*Primary Examiner* — Kyle Zhai
(74) *Attorney, Agent, or Firm* — Studebaker & Brackett PC (57) ABSTRACT

An image processing apparatus includes an input interface to acquire an image, and first to fourth controllers. The first controller performs image processing on the image. The second controller performs correction on an optical distortion in the image. The third controller performs recognition on the image. The fourth controller superimposes a result of the recognition onto the image and outputs a resulting image. The first controller can perform first and second image processing. The second controller can perform first and second correction processing. The third controller receives an input of the image, and outputs information indicating a location of a recognized object. The fourth controller receives an input of the image, and superimposes a drawing indicating the location of the recognized object onto a corresponding location in the image.

8 Claims, 5 Drawing Sheets (51) Int. Cl.
*G06V 20/58* (2022.01)
*G06T 7/70* (2017.01)
*G06T 11/00* (2006.01)
*H04N 5/232* (2006.01)
*H04N 5/91* (2006.01)
*H04N 7/18* (2006.01)
*G06V 10/20* (2022.01)

(52) U.S. Cl.
CPC .............. *G06V 10/20* (2022.01); *G06V 20/58* (2022.01); *H04N 5/23229* (2013.01); *H04N 5/91* (2013.01); *H04N 7/18* (2013.01); *B60R 2300/308* (2013.01); *B60R 2300/804* (2013.01); *B60R 2300/8033* (2013.01); *B60R 2300/8093* (2013.01); *G06T 2207/30261* (2013.01)

(56) References Cited

U.S. PATENT DOCUMENTS

| | | | | |
|---|---|---|---|---|
| 2013/0021488 | A1* | 1/2013 | Plowman | H04N 19/54 348/222.1 |
| 2013/0265468 | A1* | 10/2013 | Morimura | H04N 5/23238 348/240.2 |

FOREIGN PATENT DOCUMENTS

| | | | |
|---|---|---|---|
| JP | 2008-028956 | A | 2/2008 |
| JP | 2008-158682 | A | 7/2008 |
| JP | 2010-136207 | A | 6/2010 |
| JP | 2010-171503 | A | 8/2010 |

* cited by examiner

IMAGE PROCESSING APPARATUS, IMAGING APPARATUS, DRIVING ASSISTANCE APPARATUS, MOBILE BODY, AND IMAGE PROCESSING METHOD

CROSS REFERENCE TO RELATED APPLICATION

This application claims priority to and the benefit of Japanese Patent Application No. 2017-207177 filed on Oct. 26, 2017, the entire contents of which are incorporated herein by reference.

TECHNICAL FIELD

The present disclosure relates to an image processing apparatus, an imaging apparatus, a driving assistance apparatus, a mobile body, and an image processing method.

BACKGROUND

Conventionally, apparatuses that detect obstacles from images which capture the surroundings of a mobile body and display the obstacles are known.

For example, a pedestrian detection and display apparatus detects an image of a pedestrian based on an image which captures a traveling direction of a vehicle, attaches a rectangular frame to the position of the image of the pedestrian, and outputs the image of the pedestrian to a display apparatus.

SUMMARY

An image processing apparatus according to the present disclosure includes an input interface and first to fourth controllers. The input interface is configured to acquire an image. The first controller is configured to perform image processing on the image. The second controller is configured to perform correction processing to correct optical distortion in the image caused by an optical system that captured the image. The third controller is configured to perform recognition processing on an image to which the image processing has been performed and in which the optical distortion has been corrected. The fourth controller is configured to superimpose a result of the recognition processing onto an image subjected to the image processing and the correction processing and output a resulting image. The first controller can perform at least two types of image processing: first image processing and second image processing. The second controller can perform at least two types of correction processing: first correction processing and second correction processing. The third controller is configured to receive an input of an image to which the first image processing and the first correction processing have been performed and output information indicating a location of a recognized object in the image. The fourth controller is configured to receive an input of an image to which the second image processing and the second correction processing have been performed and the information indicating the location of the recognized object, and superimpose a drawing indicating the location of the recognized object onto a corresponding location in the image.

An imaging apparatus according to the present disclosure includes an imaging optical system, an image sensor, and first to fourth controllers. The image sensor is configured to photoelectrically convert an object image acquired via the imaging optical system and output an image signal. The first controller is configured to perform image processing on the image signal. The second controller is configured to perform correction processing to correct optical distortion in an image caused by the imaging optical system. The third controller is configured to perform recognition processing on an image to which the image processing has been performed and in which the optical distortion has been corrected. The fourth controller is configured to superimpose a result of the recognition processing onto the image subjected to the image processing and the correction processing and output a resulting image. The first controller can perform at least two types of image processing: first image processing and second image processing. The second controller can perform at least two types of correction processing: first correction processing and second correction processing. The third controller is configured to receive an input of an image to which the first image processing and the first correction processing have been performed and output information indicating a location of a recognized object in the image. The fourth controller is configured to receive an input of an image to which the second image processing and the second correction processing have been performed and the information indicating the location of the recognized object, and superimpose a drawing indicating the location of the recognized object onto a corresponding location in the image.

A driving assistance apparatus according to the present disclosure includes an imaging optical system, an image sensor, first to fourth controllers, and a display. The image sensor is configured to photoelectrically convert an object image acquired via the imaging optical system and output an image signal. The first controller is configured to perform image processing on the image signal. The second controller is configured to perform correction processing to correct an optical distortion in an image caused by the imaging optical system. The third controller is configured to perform recognition processing on an image to which the image processing has been performed and in which the optical distortion has been corrected. The fourth controller is configured to superimpose a result of the recognition processing onto the image subjected to the image processing and the correction processing and output a resulting image. The display is configured to display an image output from the fourth controller. The first controller can perform at least two types of image processing: first image processing and second image processing. The second controller can perform at least two types of correction processing: first correction processing and second correction processing. The third controller is configured to receive an input of an image to which the first image processing and the first correction processing have been performed and output information indicating a location of a recognized object in the image. The fourth controller is configured to receive an input of an image to which the second image processing and the second correction processing have been performed and the information indicating the location of the recognized object, and superimpose a drawing indicating the location of the recognized object at a corresponding location in the image. The display is configured to display the image upon receiving the image from the fourth controller.

A mobile body according to the present disclosure is equipped with the driving assistance apparatus described above.

An image processing method according to the present disclosure includes a step of acquiring an image. The image processing method includes a step of performing at least two types of image processing: first image processing and second image processing, on the image. The image processing method includes a step of performing at least two types of correction processing: first correction processing and second correction processing, to correcting optical distortion in the image caused by an optical system that captured the image. The image processing method includes a step of performing recognition processing on an image to which the first image processing and the first correction processing has been performed. The image processing method includes a step of superimposing a location of a recognized object onto a corresponding location in an image subjected to the second image processing and the second correction processing.

DETAILED DESCRIPTION

The detection of rate of obstacles and the like in images to be displayed by a driving assistance apparatus is not necessarily high. For example, in cases in which a wide-angle lens such as a fisheye camera is used, distortion is large and the detection rate of image recognition processing may deteriorate. Also, in cases in which an image including a wide-angle viewing range is displayed on a display, it is difficult to correct distortion in a secured field of vision. Further, although for the purposes of display a sharp image with high contrast improves visibility, for the purposes of image recognition excessive image correction may reduce the detection rate.

Hereinafter, an image processing apparatus and the like that realize both a high detection rate in image recognition and display of a highly visible image will be disclosed.

Hereinafter, embodiments of the present disclosure will be described with reference to the drawings.

Figure 1:
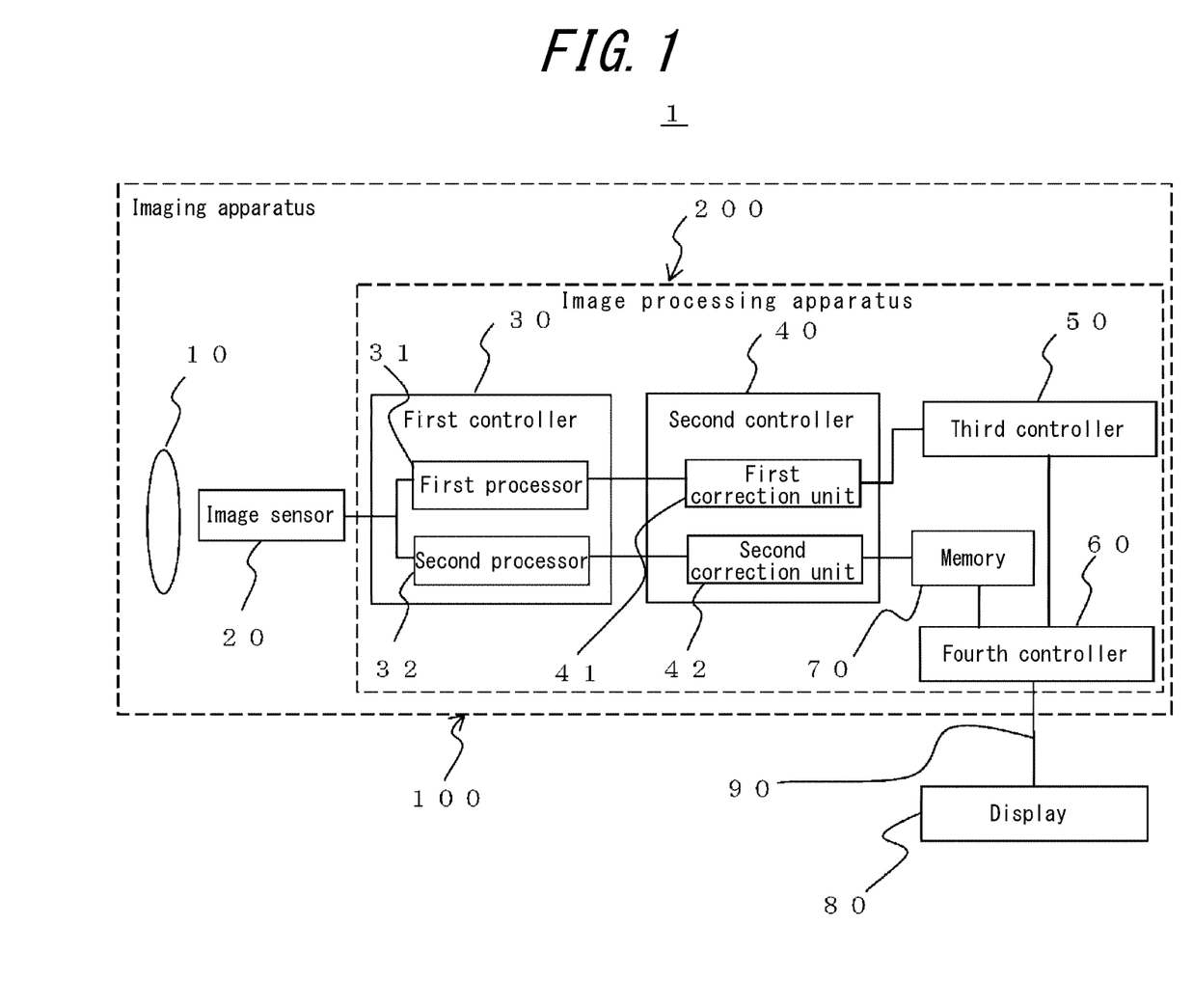
FIG. 1 is a block diagram illustrating a schematic configuration of a driving assistance apparatus.

A driving assistance apparatus 1 according to one of a plurality of embodiments includes an imaging apparatus 100 and a display 80, as illustrated in FIG. 1.

Figure 2:
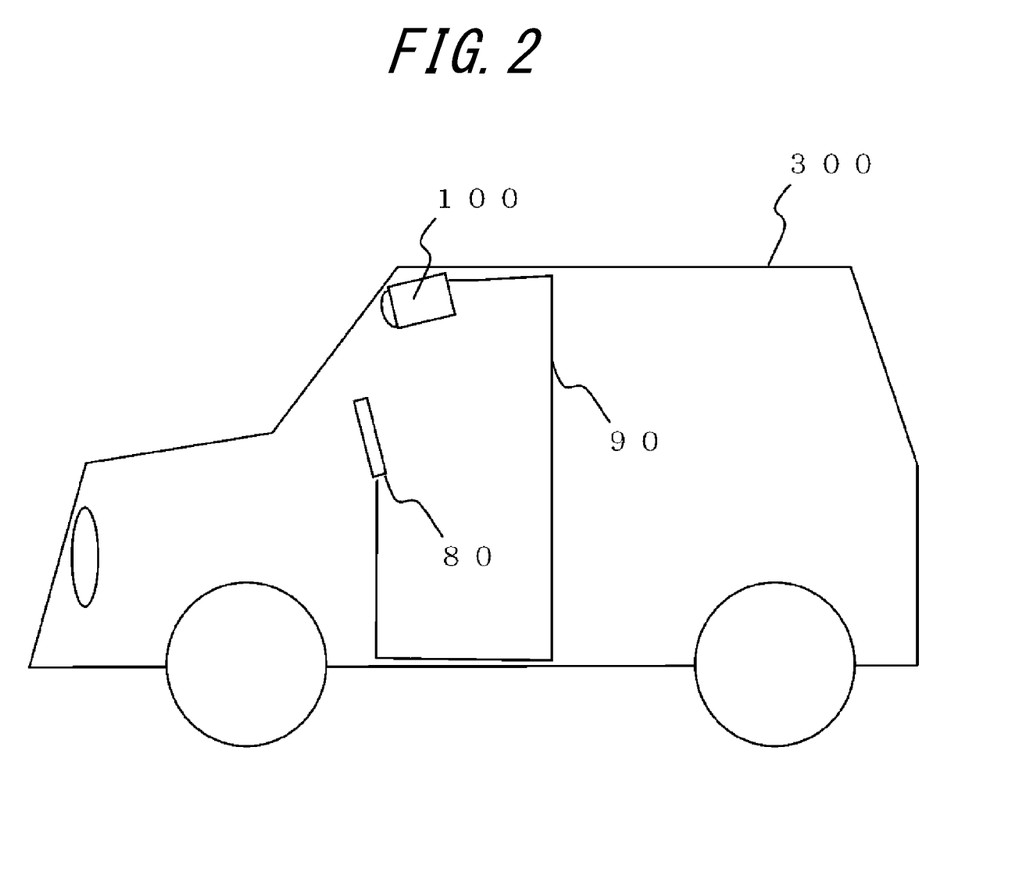
FIG. 2 is a diagram illustrating a schematic configuration of the driving assistance apparatus mounted on a mobile body.

The imaging apparatus 100 and the display 80 are mounted on a mobile body 300, as illustrated in FIG. 2. The imaging apparatus 100 and the display 80 may be connected to each other via a network 90 of the mobile body 300, such as a communication cable, a CAN (Control Area Network), or the like.

The term "mobile body" as used herein encompasses vehicles, ships, and aircraft. In the present disclosure, vehicles may include automobiles and industrial vehicles, but are not limited thereto and may also include rail vehicles, domestic vehicles, and fixed-wing aircraft that travel on a runway. Automobiles include cars, trucks, buses, motorcycles, and trolley buses, but are not limited thereto and may also include other automobiles that travel on the road. Industrial vehicles include agricultural vehicles and construction vehicles. Industrial vehicles include, but are not limited to, forklifts and golf carts. Industrial vehicles for agricultural purpose include, but are not limited to, tractors, tillers, transplanters, binders, combine harvesters, and lawn mowers. Industrial vehicles for construction purposes include, but are not limited to, bulldozers, scrapers, excavators, crane trucks, dump trucks, and load rollers. Vehicles may include human-power vehicles traveling on human power. Classification of the vehicles is not limited to the above. For example, vehicles may include industrial vehicles authorized to travel on the road, and a plurality of categories may include the same type of vehicle. According to the present disclosure, ships may include watercrafts, boats, and tankers. According to the present disclosure, aircraft may include fixed wing aircraft and rotorcraft.

The imaging apparatus 100 is, for example, installed so as to capture a forward direction travelling path of the mobile body 300. In one of a plurality of embodiments, the imaging apparatus 100 is installed in a cabin of the mobile body 300 and can capture the outside of the mobile body 300 through the windshield. In another embodiment, the imaging apparatus 100 may be fixed to one of a font bumper, a fender grille, a side fender, a lighting module, and a bonnet. The imaging apparatus 100 may be installed in a trim or a side mirror to capture the rear direction or a side direction of the mobile body 300.

The imaging apparatus 100 includes an optical system 10 (an imaging optical system), an image sensor 20, and an image processing apparatus 200, as illustrated in FIG. 1. The image processing apparatus 200 includes a first controller 30, a second controller 40, a third controller 50, a fourth controller 60, a memory 70, and the like.

The optical system 10 is a lens for condensing light such that light incident on the optical system 10 forms an image on the image sensor 20. The optical system 10 may be configured as, for example, a fish-eye lens or a super-wide-angle lens. The optical system 10 may be configured as one lens or a plurality of lenses.

The image sensor 20 is an image sensor for capturing an image formed by the optical system 10. The image sensor 20 includes a CCD (Charge-Coupled Device) image sensor or a CMOS (Complementary Metal Oxide Semiconductor) image sensor. The image sensor 20 can output an electrical signal obtained by performing photoelectrical conversion on an image formed by the optical system 10.

The first controller 30 includes an input interface configured to acquire the electrical signal output by the image sensor 20. The first controller 30 is one or more processors configured to process the electrical signal. The first controller 30 is, for example, a specialized microprocessor dedicated to execution of a specific function, or a processor configured to execute a specific function by reading out a specific program.

The first controller 30 may be a signal processing circuit such as one or more gate arrays configured to process the electrical signal output by the image sensor 20. The first controller 30 may be a signal processing circuit configured to execute a specific function equivalent to the processor mentioned above.

The first controller 30 generates an image signal representing an image from the electronic signal output by the image sensor 20. The first controller 30 may perform any processing on the image, such as contrast adjustment, edge enhancement, brightness adjustment, or gamma correction.

The first controller 30 may include a plurality of processors such as a first processor 31 and a second processor 32 and execute different image processing in parallel. The first controller 30 may include one processor and perform different image processing sequentially.

The second controller 40 performs, for example, distortion correction to correct distortion in the image subjected to the processing performed by the first controller 30. The second controller 40 is one or more processors. The second controller 40 is, for example, a specialized processor dedicated to execution of a specific function, or a processor configured to execute a specific function by reading out a specific program.

The second controller 40 performs, for example, distortion correction to correct distortion in the image subjected to the processing performed by the first controller 30. The second controller 40 may be a signal processing circuit such as one or more gate arrays. The second controller 40 may be, for example, a signal processing circuit configured to execute a specific function equivalent to the processor mentioned above.

The second controller 40 may perform any correction processing including, for example, correction of distortion caused by characteristics such as a distortion aberration of the optical system 10 that captured the image. In particular, in a case in which the optical system 10 is a super-wide-angle optical system such as the fisheye lens, there is a tendency that the shapes of objects are deformed greatly as they are located closer to the edges of the image about the optical axis. The second controller 40 may completely correct or alleviate distortion of images that are captured using such optical systems.

The second controller 40 may include a plurality of processors such as a first correction unit 41 and a second correction unit 42 and perform different correction processing in parallel. The second controller 40 may include one processor and perform different correction processing sequentially.

The third controller 50 recognizes objects such as, for example, pedestrians, mobile bodies, traffic signs, traffic lights, road markings, obstacles, or the like included in the images subjected to the processing performed by the second controller 40. The third controller 50 is a processor. The third controller 50 is, for example, a specialized processor dedicated to execution of a specific function, or a processor configured to execute a specific function by reading out a specific program.

The third controller 50 recognizes objects such as, for example, pedestrians, mobile bodies, traffic signs, traffic lights, road markings, obstacles, or the like in the images subjected to the processing by the second controller 40. The third controller may be a signal processing circuit such as a gate array or the like. The third controller 50 may be, for example, a signal processing circuit configured to execute a specific function equivalent to the processor mentioned above.

The third controller 50 may output information indicating a location of a recognized object in the image as a recognition result. The third controller 50 may output information indicating a type of the recognized object as the recognition result.

The fourth controller 60 superimposes a drawing indicating the location of the object recognized by the third controller 50 onto the image subjected to the processing performed by the second controller 40. The fourth controller 60 is a processor. The fourth controller 60 is, for example, a specialized microprocessor dedicated to execution of a specific function, or a processor configured to execute a specific function by reading out a specific program.

The fourth controller 60 superimposes the drawing indicating the location of the object recognized by the third controller 50 onto the image subjected to the processing performed by the second controller 40. The fourth controller 60 may be a signal processing circuit such as a gate array or the like. The fourth controller 60 may be, for example, a signal processing circuit configured to execute a specific function equivalent to the processor mentioned above.

The memory 70 is a storage device for temporarily storing image data subjected to the processing performed by the second controller 40. The memory 70 is, for example, a high-speed volatile memory such as a DRAM (Dynamic Random Access Memory) or an SDRAM (Synchronous Dynamic Random Access Memory).

The memory 70 may accumulate images while the third controller 50 is performing recognition processing. When the first controller 30 and the second controller 40 sequentially perform different processing, the memory 70 may accumulate images until the different processing is complete.

The display 80 is configured to display images output by the fourth controller 60 that include drawings indicating the locations of objects recognized by the third controller 50 superimposed thereon. The display 80 may be, for example, a liquid crystal display (LCD), an organic electroluminescent (EL) display, an inorganic EL display, or a plasma display panel (PDP). The display 80 may be various flat panel displays such as, for example, a field emission display (FED), an electrophoretic display, a twisting ball display, or the like. The display 80 may be arranged on the dashboard, the instrument panel, or the like of the mobile body 300. The display 80 may be a head up display (HUD). When the display 80 is a HUD, an image may be projected onto the windshield or a combiner installed in front of the driver's seat. The display 80 may be shared by a display apparatus of another system, such as a navigation system.

The network 90 connects the fourth controller 60 and the display 80 such that electrical signals, such as image signals output from the fourth controller 60, can be transmitted to the display 80. The network 90 may connect the fourth controller 60 and the display 80 in a wired manner using a communication cable. The network 90 may connect the fourth controller 60 and the display 80 in a wireless manner conforming to various standards including, for example, Bluetooth® (Bluetooth is a registered trademark registered in Japan, other countries, or both) or IEEE 802.11.

Next, a detailed example of an operation performed by the driving assistance apparatus 1 will be described.

The driving assistance apparatus 1 starts the operation when the mobile body 300 is started, or in response to an operation performed by a driver of the mobile body 300. When the driving assistance apparatus 1 starts the operation, first, the image sensor 20 starts capturing an image of an object located around the mobile body 300 formed via the optical system 10. The image sensor 20 converts the object image into the electrical signal and outputs the electrical signal to the first controller 30.

The first controller 30 performs image quality adjustment appropriate for the recognition processing to be performed by the third controller 50, as first image processing on the image signal output by the image sensor 20. For example, the first controller 30 may perform near-linear contrast adjustment, in order to minimize data loss during the recognition process.

The first controller 30 separately performs image quality adjustment appropriate for viewing on the display 80, as second image processing, which is different from the first image processing on the image signal output by the image sensor 20. For example, the first controller 30 may increase the contrast or enhance the edges to generate a sharp image that can be easily viewed.

The first controller 30 may perform parallel processing in which the first processor 31 and the second processor 32 respectively perform the first image processing and the second image processing in parallel. By performing parallel processing, a system that reduces the processing time and thus realizes excellent real-time performance is obtained. The first controller 30 may perform sequential processing in which one processor sequentially performs the first image processing and the second image processing. By performing the sequential processing, a system that reduces the number of processors and thus is advantageous from the viewpoint of cost is obtained.

The second controller 40 performs image correction processing appropriate for the recognition processing to be performed by the third controller as the first correction processing on the image subjected to the processing performed by the first controller 30. For example, the second controller 40 may correct the image by subdividing the image into a plurality of regions and performing distortion correction appropriate for the respective regions. By correcting the distortion of the image, the shape of the object can be accurately recognized, and the recognition accuracy can be improved.

The second controller 40 separately performs the second correction processing that is different from the first correction processing and appropriate for viewing on the display 80, on the image subjected to the processing performed by the first controller 30. For example, when the display 80 displays an image in a super-wide angle of approximately 180 degrees, the second controller 40 may correct height-direction distortion alone without correcting lateral-direction distortion, such that a viewer can see a three-dimensional object standing upright.

The second controller 40 may perform parallel processing in which the first correction unit 41 and the second correction unit 42 respectively perform the first correction processing and the second correction processing in parallel. By performing parallel processing, the processing time is reduced, and thus real-time performance can be improved. Alternatively, the second controller 40 may include one processor that sequentially performs the first correction processing and the second correction processing. By performing the processing sequentially, the number of processors can be reduced, and thus cost effectiveness can be improved.

The first controller 30 may sequentially perform the first image processing and the second image processing, and the second controller 40 may sequentially perform the first correction processing and the second correction processing. In this case, the processing order may be as follows: the first controller 30 performs the first image processing, the second controller 40 performs the first correction processing, the first controller 30 performs the second image processing, and then the second controller 40 performs the second correction operation. Alternatively, the processing order may be as follows: the first controller 30 performs the second image processing, the second controller 40 performs the second correction processing, the first controller 30 performs the first image processing, and then the second controller 40 performs the first correction processing. The image may be temporarily stored in the memory 70 between the processing performed by the first controller 30 and the processing performed by the second controller 40. In particular, the first controller 30 sequentially performs the first image processing and the second image processing, and then temporarily stores the image subjected to the first image processing and the second image processing in the memory 70. Then, the second controller 40 may sequentially perform the first correction processing and the second correction processing.

One of a combination of the first image processing and the second image processing performed by the first controller 30 and a combination of the first correction processing and the second correction processing performed by the second controller 40 may be performed sequentially. In this case, the image is temporarily stored in the memory 70 between the processing performed by the first controller 30 and the processing performed by the second controller 40, so as to control the timing to transfer the image data from the first controller 30 to the second controller 40.

The third controller 50 may recognize the object by performing recognition processing such as machine learning on the image subjected to the first image processing performed by the first controller 30 and the first correction processing performed by the second controller 40. The contents of the first image processing and the first correction processing may differ depending on a method of the recognition processing. For example, in a case in which the image recognition using the machine learning is performed, near-linear contrast is appropriate as the first image processing, and complete distortion correction is appropriate as the first correction processing. However, such processing may not be necessarily appropriate for some image recognition methods. As such, the first controller 30 and the second controller 40 can respectively perform the first image processing and the first correction processing in accordance with the image recognition method.

The third controller 50 is configured to output the information indicating the location of the detected object in the image, from a result of the image recognition. The detected object may be an object such as, for example, a pedestrian, a mobile body, a traffic sign, a traffic light, a road marking, an obstacle, or the like located on or near the road on which the mobile body 300 is travelling. For example, when a pedestrian is detected as an object, the information indicating the location of the object may be represented by a single point, such as a location of a foot or the center of gravity, or the coordinates of the vertices of a rectangle surrounding the image of the pedestrian.

The fourth controller 60 is configured to superimpose a drawing indicating the location of the object detected by the third controller 50 onto an image subjected to the second image processing performed by the first controller and the second correction processing performed by the second controller 40. While the second correction processing is performed on the image used for display, the first correction processing is performed on the image used for the recognition processing performed by the third controller 50. This may cause a risk of a positional deviation between the coordinates of the same object in these images. Thus, the fourth controller 60 takes the difference caused by the first correction processing and the second correction processing into account and converts the information indicating the location of the object into a corresponding location in the image subjected to the second image processing output from the first controller 30. Then, the fourth controller 60 superimposes the drawing indicating the converted location of the object.

Figure 3:
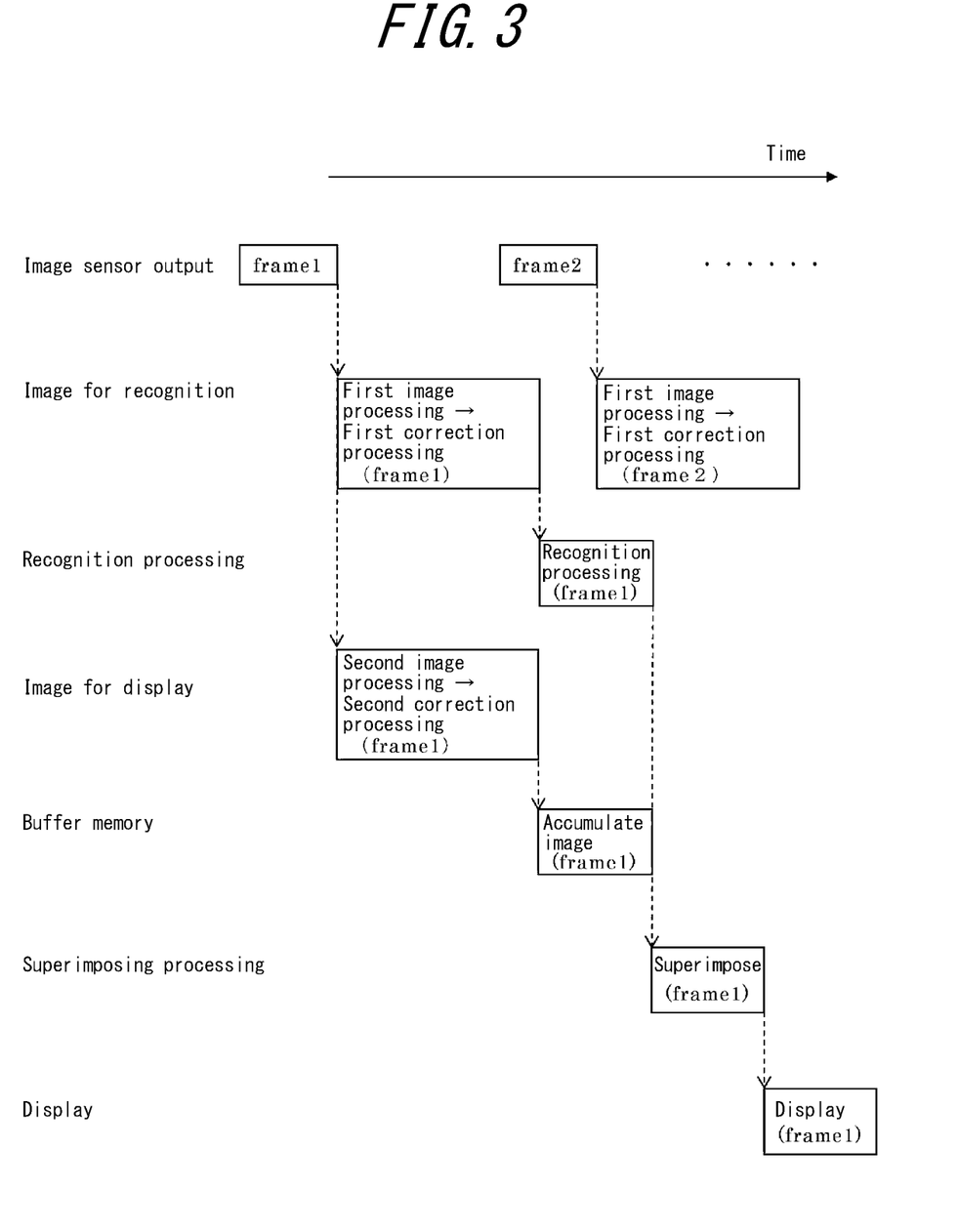
FIG. 3 is a diagram for explaining the timing of each process.

Here, the timing for each processing will be described with reference to FIG. 3. In FIG. 3, the horizontal axis represents the passage of time, and the vertical axis indicates a list of functions and processing. The image processing appropriate for the recognition processing and the image processing appropriate for display are performed in parallel, and the correction processing appropriate for the recognition processing and the correction processing appropriate for display are performed in parallel, in the example illustrated in FIG. 3.

When the image sensor 20 outputs a captured image ("frame 1"), the first controller 30 performs the first image processing appropriate for the recognition processing and the second image processing appropriate for viewing, in parallel. Subsequently, the second controller 40 performs the first correction processing and the second correction processing in parallel. The image subjected to the first correction processing is output to the third controller 50, and the image subjected to the second correction processing is output to the fourth controller 60.

In a case in which the recognition processing performed by the third controller 50 is quickly completed in a short time, the fourth controller 60 may perform the superimposing processing. However, when the recognition processing takes time, the timing for the processing may be synchronized using the memory 70. In particular, the image for which the second correction processing is completed is temporarily stored in the memory 70 and read out at the timing when the third controller 50 completes the recognition processing, whereby the timing of the processing performed by the fourth controller 60 can be synchronized. Subsequent to the processing performed on the "frame 1", the processing performed on a "frame 2" is synchronized in a similar manner.

In a case in which the image processing appropriate for the recognition processing, the image processing appropriate for display, the correction processing appropriate for the recognition processing, and the correction processing appropriate for display are sequentially performed, the image subjected to the first image processing appropriate for the recognition processing performed by the first controller 30 and the first correction processing appropriate for the recognition processing performed by the second controller 40 is output to the third controller 50. While the third controller 50 is performing the recognition processing, the second image processing appropriate for viewing and the second correction processing appropriate for viewing may be performed to synchronize the processing timings. Alternatively, one of the first controller 30 and the second controller 40 performs the parallel processing to synchronize the processing timings. In either case, when the processing timings are not synchronized, the image may be temporarily stored in the memory 70 to synchronize the processing timings.

Next, example processing performed by the imaging apparatus 100 and the image processing apparatus 200 of the driving assistance apparatus 1 according to one embodiment will be described with reference to the flowcharts illustrated in FIG. 4 and FIG. 5.

Figure 4:
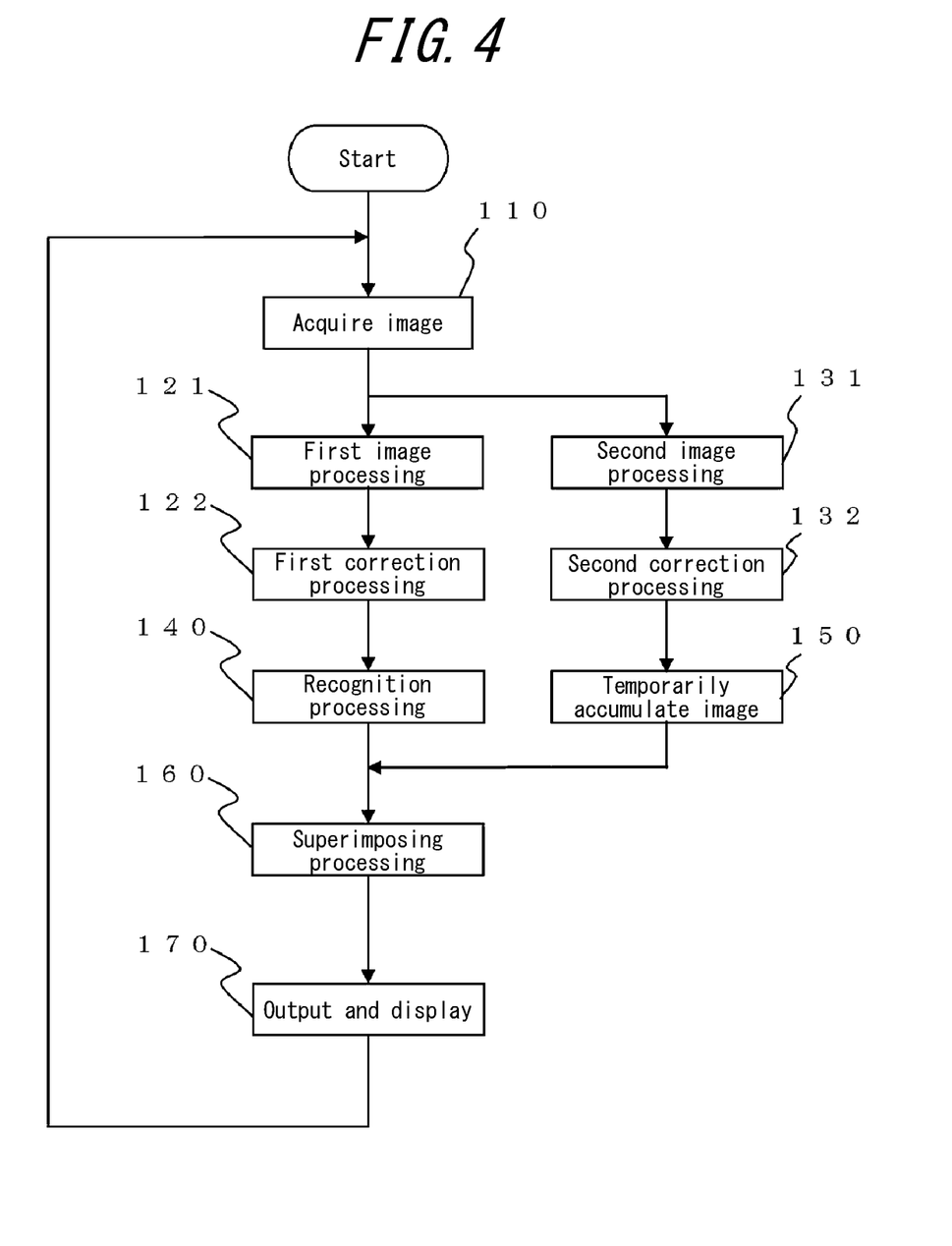
FIG. 4 is a flowchart illustrating an example flow of parallel processing.

FIG. 4 illustrates an example in which the image processing appropriate for the recognition processing and the image processing appropriate for display and the correction processing appropriate for the recognition processing and the correction processing appropriate for display are performed in parallel.

When the imaging apparatus 100 starts the operation, the image sensor 20 starts capturing an image, and the first controller 30 acquires the image (step S110).

The first processor 31 and the second processor 32 respectively perform the first image processing (step S121) appropriate for the recognition processing and the second image processing (step S131) appropriate for viewing on the image in parallel.

On the image subjected to the image processing performed by the first controller 30, the first correction unit 41 of the second controller 40 performs the first correction processing appropriate for the recognition processing (step S122), and the second correction unit 42 performs the second correction processing appropriate for viewing (step S132), in parallel.

The image subjected to the first image processing and the first correction processing is input to the third controller 50 and subjected to the recognition processing (step S140). Simultaneously, the image subjected to the second image processing and the second correction processing is input to the memory 70 and temporarily stored therein (step S150).

When the third controller 50 completes the recognition processing, the fourth controller 60 acquires the image for viewing subjected to the second image processing and the second correction processing stored in the memory 70, and the information indicating the location of the recognized object output from the third controller 50. The fourth controller 60 superimposes the drawing indicating the location of the recognized object onto a corresponding location in the image (step S160).

The image subjected to the superimposing processing performed by the fourth controller 60 is output (step S170) to and displayed on the display 80.

Next, an example in which the image processing appropriate for the recognition processing, the image processing appropriate for display, the correction processing appropriate for the recognition processing, and the correction processing appropriate for display are sequentially performed will be described, with reference to FIG. 5.

When the imaging apparatus 100 starts the operation, the image sensor 20 starts capturing an image, and the first controller 30 acquires the image (step S210).

The image is then subjected to the first image processing appropriate for the recognition processing (step S221). Subsequently, the image subjected to the first image processing is input to the second controller 40 and subjected to the first correction processing appropriate for the recognition processing (step S222).

The image subjected to the first correction processing performed by the second controller 40 is input to the third controller 50, and the third controller 50 starts the recognition processing (step S230).

When the third controller 50 starts the recognition processing, the first controller 30 performs the second image processing appropriate for viewing (step S241) and then inputs an image subjected to the second image processing to the second controller 40. Subsequently, the second controller 40 performs the second correction processing appropriate for viewing on the image subjected to the second image processing (step S242). The image subjected to the second image processing and the second correction processing is input to the memory 70 and temporarily stored therein (step S250).

The memory 70 waits while accumulating images (No at step S260), until the third controller 50 completes the recognition processing. When the third controller 50 completes the recognition processing (Yes at step S260), the fourth controller 60 acquires the image for viewing subjected to the second image processing and the second correction processing, and the information indicating the location of the recognized object output from the third controller 50. The fourth controller 60 superimposes the drawing indicating the location of the recognized object onto a corresponding location in the image (step S270).

The image subjected to the superimposing processing performed by the fourth controller 60 is output to (step S280) and displayed on the display 80.

Figure 5:
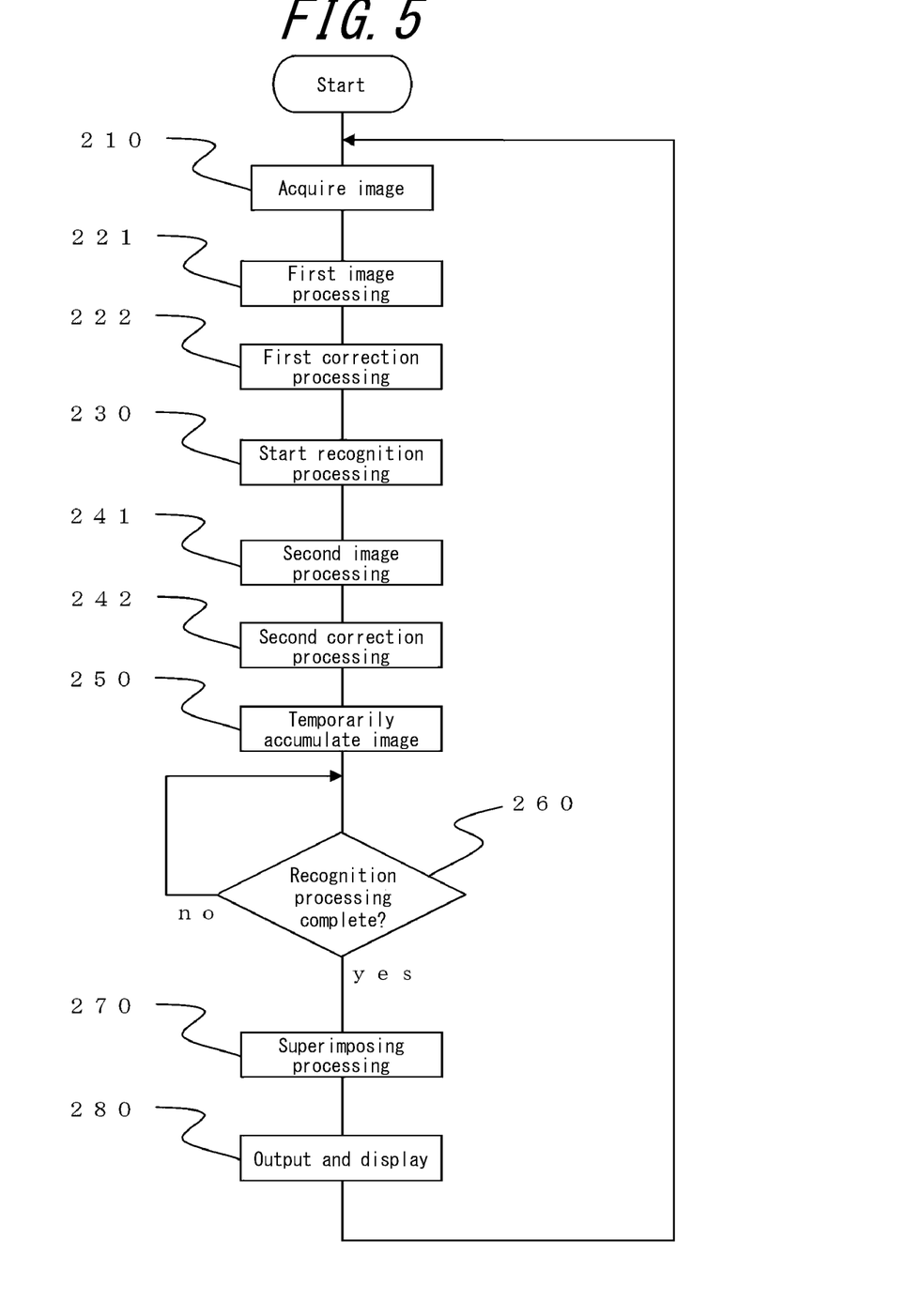
FIG. 5 is a flowchart illustrating an example flow of sequential processing.

The driving assistance apparatus 1 may be configured to execute the processing illustrated in FIG. 4 and FIG. 5 by reading out a program recorded on a non-transitory computer readable medium. The non-transitory computer readable medium includes, but is not limited to, a magnetic storage medium, an optical storage medium, a magneto-optical storage medium, or a semiconductor storage medium. The magnetic storage medium includes a magnetic disk, a hard disk, or a magnetic tape. The optical storage medium includes an optical disk such as a CD, a DVD, or a BD. The semiconductor storage medium includes a ROM (Read Only Memory), an EEPROM (Electrically Erasable Programmable Read-Only Memory), a flash memory, or the like.

According to one embodiment of the present disclosure, the image processing apparatus 200 can achieve both a high detection rate in image recognition and display of an image with excellent visibility. In particular, the image processing apparatus 200 separately performs the image processing and the image correction processing on the image appropriate for the recognition processing and on the image appropriate for viewing, converts the information indicating the location of the recognized object based on the recognition result into the corresponding location in the image for viewing, and superimposes the drawing on the corresponding location. Thus, the image processing apparatus 200 can realize both the high detection rate in image recognition and generation of an image with excellent visibility. The imaging apparatus 100 can output an image that has a high detection rate in image recognition and excellent visibility, even when a super-wide-angle optical system such as a fisheye lens is used. Further, when the driving assistance apparatus 1 that includes the imaging apparatus 100 of the present embodiment is mounted on a vehicle, the driving assistance apparatus 1 can provide the driver with an image having an excellent visibility and a highly accurate detection result of a pedestrian, a mobile body, an obstacle, or the like.

Although the above embodiments have been described as typical examples, it should be appreciated that those who are skilled in the art may perform variations or alterations in a multiple manner within the gist and scope of the present disclosure. Accordingly, the present disclosure should not be construed as being limited to the above embodiments or examples and can be varied or altered in various manners. For example, a plurality of functional blocks described in an embodiment or example may be combined, or one functional block may be subdivided.

For example, although the driving assistance apparatus 1 of the above embodiments includes the image processing apparatus 200 installed in the imaging apparatus 100, the image processing apparatus 200 does not necessarily need to be installed in the imaging apparatus 100. The image processing apparatus 200 may be installed external to the imaging apparatus 100 and configured to acquire an image output from the image sensor 20 and output an image that is subjected to the processing and having the drawing indicating the location of the object superimposed thereon to the display 80.

The invention claimed is:

1. An image processing apparatus comprising:
an input interface configured to acquire an image;
a first processor configured to perform image processing on the image;
a second processor configured to perform correction processing to correct optical distortion in the image caused by an optical system that captured the image;
a third processor configured to perform recognition processing on the image to which the image processing has been performed and in which the optical distortion has been corrected; and
a fourth processor configured to superimpose a result of the recognition processing onto the image subjected to the image processing and the correction processing, and output a resulting image,
wherein the first processor is configured to perform at least two types of the image processing: first image processing and second image processing,
the second processor is configured to perform at least two types of the correction processing comprising: first correction processing and second correction processing,
the third processor is configured to receive the image to which the first image processing and the first correction processing have been performed and output information indicating a location of a recognized object in the image,
the fourth processor is configured to receive the image to which the second image processing and the second correction processing have been performed and the information indicating the location of the recognized object, and superimpose a drawing indicating the location of the recognized object onto a corresponding location in the image,
the first image processing includes performing a near-linear contrast adjustment in order to minimize data loss during the recognition process,
the second image processing includes increasing contrast or enhancing edges to thereby increase sharpness of the image,
the first correction processing includes correcting the image by subdividing the image into a plurality of regions and performing distortion correction appropriate for the respective regions, and
when the image is displayed in a super-wide angle, the second correction processing includes correcting height-direction distortion alone without correcting lateral-direction distortion, such that a viewer can see a three-dimensional object standing upright.

2. The image processing apparatus according to claim 1, wherein at least one of a combination of the first image processing and the second image processing and a combination of the first correction processing and the second correction processing is performed in parallel.

3. The image processing apparatus according to claim 1, wherein at least one of a combination of the first image processing and the second image processing and a combination of the first correction processing and the second correction processing is performed sequentially.

4. The image processing apparatus according to claim 1, further comprising a memory for storing continuously acquired images on which the image processing and the correction processing have been performed,
wherein the memory stores the continuously acquired images until the recognition processing performed by the third processor is complete.

5. An imaging apparatus comprising:
an imaging optical system;

an image sensor configured to photoelectrically convert an object image acquired via the imaging optical system, and output an image signal;
a first processor configured to perform image processing on the image signal;
a second processor configured to perform correction processing to the image signal to which the image processing has been performed to correct optical distortion in the object image caused by the imaging optical system;
a third processor configured to perform recognition processing on an image to which the image processing has been performed and in which the optical distortion has been corrected; and
a fourth processor configured to superimpose a result of the recognition processing onto the image signal subjected to the image processing and the correction processing and output a resulting image signal,
wherein the first processor is configured to perform at least two types of the image processing comprising: first image processing and second image processing,
the second processor is configured to perform at least two types of the correction processing comprising: first correction processing and second correction processing,
the third processor is configured to receive the image signal to which the first image processing and the first correction processing have been performed and output information indicating a location of a recognized object in the image signal,
the fourth processor is configured to receive the image signal to which the second image processing and the second correction processing have been performed and the information indicating the location of the recognized object, and superimpose a drawing indicating the location of the recognized object onto a corresponding location in the image signal,
the first image processing includes performing a near-linear contrast adjustment in order to minimize data loss during the recognition process,
the second image processing includes increasing contrast or enhancing edges to thereby increase sharpness of the image,
the first correction processing includes correcting the image by subdividing the image into a plurality of regions and performing distortion correction appropriate for the respective regions, and
when the image is displayed in a super-wide angle, the second correction processing includes correcting height-direction distortion alone without correcting lateral-direction distortion, such that a viewer can see a three-dimensional object standing upright.

6. A driving assistance apparatus comprising:
an imaging optical system;
an image sensor configured to photoelectrically convert an object image acquired via the imaging optical system, and output an image signal;
a first processor configured to perform image processing on the image signal;
a second processor configured to perform correction processing to the image signal to which the image processing has been performed to correct optical distortion in the image caused by the imaging optical system;
a third processor configured to perform recognition processing on the image to which the image processing has been performed and in which the optical distortion has been corrected;
a fourth processor configured to superimpose a result of the recognition processing onto the image signal subjected to the image processing and the correction processing, and output a resulting image; and
a display configured to display the resulting image output from the fourth processor,
wherein the first processor can perform at least two types of the image processing comprising: first image processing and second image processing,
the second processor is configured to perform at least two types of the correction processing comprising: first correction processing and second correction processing,
the third processor is configured to receive the image signal to which the first image processing and the first correction processing have been performed and output information indicating a location of a recognized object in the image signal,
the fourth processor is configured to receive the image signal to which the second image processing and the second correction processing have been performed and the information indicating the location of the recognized object, and superimpose a drawing indicating the location of the recognized object at a corresponding location in the image signal,
the display is configured to display the resulting image upon receiving the resulting image from the fourth processor,
the first image processing includes performing a near-linear contrast adjustment in order to minimize data loss during the recognition process,
the second image processing includes increasing contrast or enhancing edges to thereby increase sharpness of the image,
the first correction processing includes correcting the image by subdividing the image into a plurality of regions and performing distortion correction appropriate for the respective regions, and
when the image is displayed in a super-wide angle, the second correction processing includes correcting height-direction distortion alone without correcting lateral-direction distortion, such that a viewer can see a three-dimensional object standing upright.

7. A mobile body comprising a driving assistance apparatus according to claim 6.

8. An image processing method comprising:
acquiring an image;
performing at least two types of image processing comprising: first image processing and second image processing, on the image;
performing at least two types of correction processing comprising: first correction processing and second correction processing on the image to which the at least two types of image processing has been performed, to correct optical distortion in the image caused by an optical system that captured the image;
performing recognition processing on the image to which the first image processing and the first correction processing have been performed; and
superimposing a drawing indicating a location of a recognized object onto a corresponding location in the image subjected to the second image processing and the second correction processing, wherein
the first image processing includes performing a near-linear contrast adjustment in order to minimize data loss during the recognition process, the second image processing includes increasing contrast or enhancing edges to thereby increase sharpness of the image, the first correction processing includes correcting the image by subdividing the image into a plurality of regions and performing distortion correction appropriate for the respective regions, and when the image is displayed in a super-wide angle, the second correction processing includes correcting height-direction distortion alone without correcting lateral-direction distortion, such that a viewer can see a three-dimensional object standing upright.

\* \* \* \* \*